US012669111B2

(12) United States Patent
Wang et al.

(10) Patent No.: US 12,669,111 B2
(45) Date of Patent: Jun. 30, 2026

(54) METHOD AND DEVICE FOR FAULT EARLY WARNING OF A YAW SYSTEM OF A WIND TURBINE GENERATOR SET

(71) Applicant: HUANENG ANHUI MENGCHENG WIND POWER GENERATION CO., LTD., Bozhou City (CN)

(72) Inventors: Xueliang Wang, Bozhou City (CN); Lianbo Liu, Bozhou City (CN); Dengke Ma, Bozhou City (CN); Xingzhong Liu, Bozhou City (CN); Bosong Ding, Bozhou City (CN); Xiaokang Chu, Bozhou City (CN); Qingyong Wu, Bozhou City (CN)

(*) Notice: Subject to any disclaimer, the term of this patent is extended or adjusted under 35 U.S.C. 154(b) by 0 days.

(21) Appl. No.: 19/356,117

(22) Filed: Oct. 11, 2025

(65) Prior Publication Data

US 2026/0036114 A1     Feb. 5, 2026

(30) Foreign Application Priority Data

Oct. 11, 2024     (CN) ......................... 202411416502.2

(51) Int. Cl.
F03D 17/00          (2016.01)

(52) U.S. Cl.
CPC ....... F03D 17/014 (2023.08); F03D 17/0065 (2023.08); F03D 17/029 (2023.08); *F05B 2260/80* (2013.01); *F05B 2260/84* (2013.01)

(58) Field of Classification Search
CPC .. F03D 17/014; F03D 17/0065; F03D 17/029; F03D 7/02024
See application file for complete search history.

(56) References Cited

U.S. PATENT DOCUMENTS

2012/0209539 A1*  8/2012  Kim ................... G05B 23/0221
                                                     702/41
2019/0101101 A1*  4/2019  Dharmadhikari ....... F03D 17/00

FOREIGN PATENT DOCUMENTS

CN          107238508 A      10/2017
CN          111664061 A       9/2020
            (Continued)

OTHER PUBLICATIONS

CNIPA First Office Action, Application No. 202510837231.6, Dated Jul. 30, 2025, English Translation, pp. 1-3.
(Continued)

*Primary Examiner* — Courtney D Heinle
*Assistant Examiner* — Cameron A Corday

(57)          ABSTRACT

The invention provides a method and a device for fault diagnosis of a yaw system in a wind turbine, and relates to the technical field of wind turbines. The method comprises the following steps: acquiring monitoring data collected in a yaw system, inputting the monitoring data into a yaw fault diagnosis model, and outputting a fault diagnosis result, wherein the fault diagnosis model is obtained by training known fault diagnosis results and corresponding monitoring data, and the fault diagnosis result comprises at least one of the following: the position of a yaw sensor is shifted, the yaw sensor is damaged, the yaw contactor is stuck, the hardware of a yaw motor/reducer is damaged, and the yaw motor is braked, In the working process, the monitoring data collected by the yaw system can be input into the yaw fault diagnosis model in real time, and the yaw fault diagnosis model can be used to determine whether the yaw system has a fault and the specific fault diagnosis results when the fault occurs. In this way, the operation and maintenance personnel can be prevented from going to the aircraft seat for inspec-
(Continued)

tion, and the fault diagnosis efficiency of the yaw system can be improved.

8 Claims, 3 Drawing Sheets

(56)                    References Cited

FOREIGN PATENT DOCUMENTS

| CN | 114810480 | A | * | 7/2022 | ............. | F03D 17/00 |
| CN | 117290732 | A | | 12/2023 | | |
| CN | 117972535 | A | | 5/2024 | | |
| GB | 2481789 | A | * | 1/2012 | ........... | F03D 7/0204 |

OTHER PUBLICATIONS

CNIPA First Office Action, Application No. 2025108372 31.6, Dated Jul. 30, 2025, Original Chinese, pp. 1-2.

Yao, Jie et al.; Device state diagnosis method and device; CN Patent No. CN107238508A; English language abstract; Oct. 10, 2017; 1 page.

Liu Lihua et al.; A method and a device for fault diagnosis of a yaw system in a wind turbine; CN Patent No. CN111664061A; English language abstract; Sep. 15, 2020; 1 page.

Qu Dao Kuan et al.; Method for constructing a fault classification model; CN Patent No. CN117290732A; English language abstract; Jan. 12, 2024; 1 page.

Chai Baotong et al.; Fault early warning method, a device, equipment and a storage medium for key components of a wind turbine; CN Patent No. CN117972535A; English language abstract; May 7, 2024; 1 page.

Deng et al., Research on Diagnosis Method of Wind Turbine Yaw Gearbox Based on SCADA Data Feature Extraction, Journal of Chinese Society of Power Engineering, Jan. 1, 2021, 43-50, vol. 41, No. 1, Chinese original with English abstract, 9 pages.

* cited by examiner

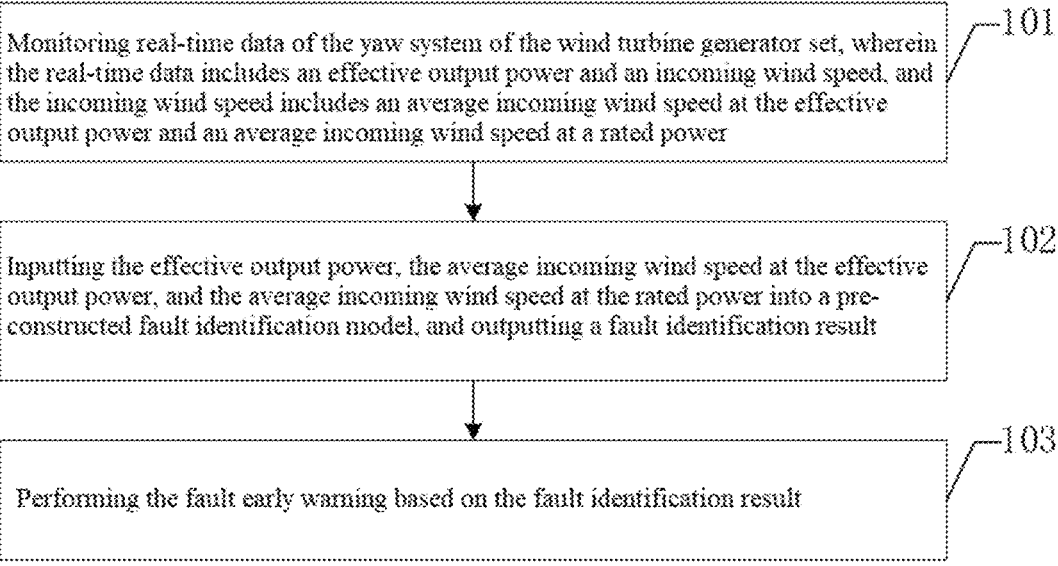

Monitoring real-time data of the yaw system of the wind turbine generator set, wherein the real-time data includes an effective output power and an incoming wind speed, and the incoming wind speed includes an average incoming wind speed at the effective output power and an average incoming wind speed at a rated power ⟋101

Inputting the effective output power, the average incoming wind speed at the effective output power, and the average incoming wind speed at the rated power into a pre-constructed fault identification model, and outputting a fault identification result ⟋102

Performing the fault early warning based on the fault identification result ⟋103

FIG. 1

METHOD AND DEVICE FOR FAULT EARLY WARNING OF A YAW SYSTEM OF A WIND TURBINE GENERATOR SET

CROSS-REFERENCE TO RELATED APPLICATIONS

This application claims priority of Chinese Patent Application No. 202411416502.2, filed on Oct. 11, 2024, the contents of which are hereby incorporated by reference.

TECHNICAL FIELD

The present application relates to the technical field of fault early warning, and in particular, to a method and device for fault early warning of a yaw system of a wind turbine generator set.

BACKGROUND

A yaw system, also known as a wind alignment device, is part of a nacelle of a wind turbine. Its main function is to quickly and stably adjust the wind turbine to align with the wind direction when the direction of the wind speed vector changes, so that a wind rotor obtains maximum wind energy. The yaw system usually includes a wind vane for sensing wind direction, an actuator of the yaw system, and the like. The design of the yaw system needs to consider the structural form, cable unwinding and twisting protection, yaw rotation speed, yaw damping, azimuth detection, and technical requirements for main components. The yaw system is an important subsystem in a wind turbine generator set, and is crucial for improving the efficiency and performance of the wind turbine generator set.

Faults in the yaw system may cause the wind turbine to fail to correctly align with the wind direction, thereby reducing the wind energy received by the wind rotor and lowering power generation efficiency. The faults in the yaw system may cause the wind turbine generator set to shut down to wait for maintenance, which will prolong downtime and reduce power generation.

Therefore, how to timely and accurately perform fault early warning on the status of the yaw system has become an urgent technical problem to be solved by those of skill in the art.

SUMMARY

The present application provides a method and device for fault early warning of a yaw system of a wind turbine generator set, to solve the defect of poor accuracy in fault early warning of a yaw system in the prior art.

In a first aspect, the present application provides method for fault early warning of a yaw system of a wind turbine generator set, comprising:

monitoring real-time data of the yaw system of the wind turbine generator set, wherein the real-time data includes an effective output power and an incoming wind speed, and the incoming wind speed includes an average incoming wind speed at the effective output power and an average incoming wind speed at a rated power;

inputting the effective output power, the average incoming wind speed at the effective output power, and the average incoming wind speed at the rated power into a pre-constructed fault identification model, which outputs a fault identification result; and performing the fault early warning based on the fault identification result, wherein the fault identification model is the following formula:

$$V = 1 - \frac{P/\overline{V}^3}{P_0/\overline{V_0}^3};$$

in the formula, V represents the fault identification result, with a value range of (0, 1); P represents the effective output power; $P_0$ is the rated power of the wind turbine generator set; $\overline{V}$ represents the average incoming wind speed at the effective output power; and $\overline{V_0}$ represents the average incoming wind speed at the rated power.

According to a method for fault early warning of a yaw system of a wind turbine generator set provided by the present application, the effective output power of the wind turbine generator set is monitored according to:

$$P = \frac{1}{2}\rho\pi r^2 C_P\left(\overline{V}\cos\theta\right)^3$$

the rated power of the wind turbine generator set is monitored according to:

$$P_0 = \frac{1}{2}\rho\pi r^2 C_P\overline{V_0}^3$$

where $\rho$ is an air density under standard atmospheric pressure; r is a radius of a wind turbine impeller; $C_P$ is a wind energy utilization coefficient under normal operating conditions; and $\theta$ is an included angle between a wind direction and a nacelle position.

According to a method for fault early warning of a yaw system of a wind turbine generator set provided by the present application, said performing the fault early warning based on the fault identification result comprises:

if the fault identification result indicates a fault, then performing a first classification on the fault identification result to determine a first fault type, wherein the first fault type comprises an actuator fault and a wind vane fault of the yaw system; and performing the fault early warning based on the actuator fault and the wind vane fault, respectively.

According to a method for fault early warning of a yaw system of a wind turbine generator set provided by the present application, said performing a first classification on the fault identification result to determine a first fault type includes:

acquiring first wind direction data of a wind vane of the yaw system of the wind turbine generator set in a first time period, and constructing a first wind direction sequence;

acquiring second wind direction data of a wind direction of a wind farm in the first time period, and constructing a second wind direction sequence;

determining a similarity value between the first wind direction sequence and the second wind direction sequence;

if the similarity value is greater than or equal to a similarity threshold, then determining that the first fault type is the actuator fault of the yaw system; and if the similarity value is less than the similarity threshold, then determining that the first fault type is the wind vane fault.

According to a method for fault early warning of a yaw system of a wind turbine generator set provided by the present application, further including:

if the first fault type is the actuator fault of the yaw system, then performing a second classification on the actuator fault of the yaw system to determine a second fault type, the second fault type comprises a transmission system fault and a positioning system fault; and performing the fault early warning based on the transmission system fault and the positioning system fault.

According to a method for fault early warning of a yaw system of a wind turbine generator set provided by the present application, the transmission system fault is identified by the following formulas:

$$i' = \frac{\omega_{in}}{\omega_{out}}$$

$$\alpha_{out} = \frac{T_{out}}{J_{out}}$$

where i' represents a calculated transmission ratio; i represents a designed transmission ratio; $\omega_{in}$ represents an angular velocity of an input end of the transmission system; $\omega_{out}$ represents an angular velocity of an output end of the transmission system; $T_{out}$ represents a torque of the output end of the transmission system; $J_{out}$ represents a moment of inertia of the output end of the transmission system; and $\alpha_{out}$ represents an angular acceleration of the output end of the transmission system.

According to a method for fault early warning of a yaw system of a wind turbine generator set provided by the present application, further including:

acquiring historical data of the yaw system of the wind turbine generator set, wherein the historical data includes the designed transmission ratio of the transmission system, and the angular acceleration of the output end of the transmission system during normal operation and abnormal operation of the transmission system;

setting a fault threshold for the angular acceleration of the output end of the transmission system according to the angular acceleration of the output end of the transmission system during normal operation and abnormal operation of the transmission system;

comparing the calculated transmission ratio with the designed transmission ratio; and if the calculated transmission ratio and the designed transmission ratio are different, then the transmission system is faulty;

if the calculated transmission ratio and the designed transmission ratio are the same, then determining a relationship between the angular acceleration of the output end of the transmission system and the fault threshold for the angular acceleration of the output end of the transmission system; and if a calculated angular acceleration of the output end of the transmission system is outside the fault threshold for the angular acceleration of the output end of the transmission system, then the transmission system is faulty.

According to a method for fault early warning of a yaw system of a wind turbine generator set provided by the present application, the positioning system fault is identified by the following formula:

$$G(s) = \frac{K}{\Gamma s + 1}$$

where G(s) represents a transfer function of the positioning system; K represents a feedback coefficient of the positioning system, indicating a proportional relationship between an output signal and an input signal; $\Gamma$ represents a feedback filtering time constant; and s represents a complex variable in Laplace transform.

According to a method for fault early warning of a yaw system of a wind turbine generator set provided by the present application, further comprising:

acquiring historical data of the yaw system of the wind turbine generator set, wherein the historical data includes historical amplitude-frequency characteristics of the positioning system;

calculating real-time amplitude-frequency characteristics of the positioning system;

comparing the historical amplitude-frequency characteristics with the real-time amplitude-frequency characteristics of the positioning system; and if the historical amplitude-frequency characteristics do not match the real-time amplitude-frequency characteristics, determining that the positioning system is faulty.

In a second aspect, the present application further provides a device for fault early warning of a yaw system of a wind turbine generator set, comprising:

a detection module configured to monitor real-time data of the yaw system of the wind turbine generator set, wherein the real-time data includes an effective output power and an incoming wind speed, and the incoming wind speed includes an average incoming wind speed at the effective output power and an average incoming wind speed at a rated power;

an identification module configured to input the effective output power, the average incoming wind speed at the effective output power, and the average incoming wind speed at the rated power into a pre-constructed fault identification model, and output a fault identification result; and an early warning module configured to perform the fault early warning based on the fault identification result;

wherein the fault identification model is the following formula:

$$V = 1 - \frac{P/\bar{V}^3}{P_o/\bar{V}_o^3};$$

in the formula, V represents the fault identification result, with a value range of (0, 1); P represents the effective output power; $P_0$ is the rated power of the wind turbine generator set; $\bar{V}$ represents the average incoming wind speed at the effective output power; and $\bar{V}_0$ represents the average incoming wind speed at the rated power.

In a third aspect, the present application further provides an electronic device, comprising a memory, a processor, and a computer program stored on the memory and executable on the processor, where the processor implements the method for fault early warning of a yaw system of a wind turbine generator set as described in any one of the above when executing the program.

In a fourth aspect, the present application further provides a non-transitory computer-readable storage medium having a computer program stored thereon, where the computer program implements the method for fault early warning of a yaw system of a wind turbine generator set as described in any one of the above when executed by a processor.

In a fifth aspect, the present application further provides a computer program product, comprising a computer program, where the computer program implements the method for fault early warning of a yaw system of a wind turbine generator set as described in any one of the above when executed by a processor.

The present application provides a method and device for fault early warning of a yaw system of a wind turbine generator set. The method includes: monitoring real-time data of the yaw system of the wind turbine generator set, where the real-time data includes effective output power and incoming wind speed, and the incoming wind speed includes an average incoming wind speed at the effective output power and an average incoming wind speed at a rated power; inputting the effective output power, the average incoming wind speed at the effective output power, and the average incoming wind speed at the rated power into a pre-constructed fault identification model, which outputs a fault identification result; and performing fault early warning based on the fault identification result. Due to performing early warning through the fault identification model, the timeliness of fault early warning is effectively ensured, corresponding preventive maintenance can be taken during the fault incubation period, and the safety of the yaw system is guaranteed. Moreover, the fault early warning model is determined by multiple types of data, which further improves the accuracy of fault early warning.

BRIEF DESCRIPTION OF THE DRAWINGS

To more clearly illustrate the technical solutions in the present application or the prior art, a brief introduction to the accompanying drawings required to be used in the description of the embodiments or the prior art. Apparently, the accompanying drawings in the following description are some embodiments of the present application. For those of ordinary skill in the art, other drawings can be obtained based on these drawings without creative efforts.

FIG. 1 is a schematic flowchart of a method for fault early warning of a yaw system of a wind turbine generator set according to this embodiment;

DETAILED DESCRIPTION OF THE EMBODIMENTS

Figure 2:
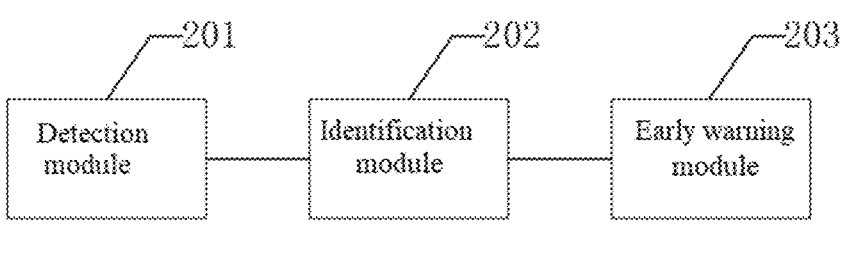
FIG. 2 is a schematic structural diagram of a device for fault early warning of a yaw system of a wind turbine generator set according to this embodiment.

To make the objectives, technical solutions, and advantages of the present application clearer, the technical solutions in the present application will be clearly and completely described below in conjunction with the drawings in the present application. Apparently, the described embodiments are some embodiments of the present application, rather than all the embodiments. Based on the embodiments in the present application, all other embodiments obtained by those of ordinary skill in the art without creative effects shall fall within the protection scope of the present application.

FIG. 1 is a schematic flowchart of a method for fault early warning of a yaw system of a wind turbine generator set according to this embodiment.

As shown in FIG. 1, the method for fault early warning of a yaw system of a wind turbine generator set according to the embodiment of the present application mainly includes the following steps 101-103.

101. Monitoring real-time data of the yaw system of the wind turbine generator set, where the real-time data includes effective output power and incoming wind speed, and the incoming wind speed includes an average incoming wind speed at the effective output power and an average incoming wind speed at a rated power.

In a specific implementation process, the yaw system is an important component of the wind turbine generator set. Its function is to control a nacelle of the wind turbine generator set to enable the nacelle to automatically adjust its direction according to a change in wind direction, so as to capture wind energy to the maximum extent. The yaw system includes a wind vane and an actuator, and the actuator at least includes a transmission system, a positioning system and other components.

Where the effective output power of the wind turbine generator set is monitored according to formula (1):

$$P = \frac{1}{2}\rho\pi r^2 C_p \ \left(\overline{V}\cos\theta\right)^3 \tag{1}$$

the rated power of the wind turbine generator set is monitored according to formula (2):

$$P_o = \frac{1}{2}\rho\pi r^2 C_p \overline{V_o}^3 \tag{2}$$

where $\rho$ is an air density under standard atmospheric pressure; r is a radius of a wind turbine impeller; $C_P$ is a wind energy utilization coefficient under normal operating conditions; and $\theta$ is an included angle between a wind direction and a nacelle position.

And an acquisition manner of the incoming wind speed can be collection by means of sensors.

102. Inputting the effective output power, the average incoming wind speed at the effective output power, and the average incoming wind speed at the rated power into a pre-constructed fault identification model, which outputs a fault identification result.

The fault identification model is formula (3):

$$V = 1 - \frac{P/\overline{V}^3}{P_0/\overline{V_0}^3} \tag{3}$$

In the formula, V represents the fault identification result, with a value range of (0, 1); P represents the effective output power; $P_0$ is the rated power of the wind turbine generator set; $\overline{V}$ represents the average incoming wind speed at the effective output power; and $\overline{V_0}$ represents the average incoming wind speed at the rated power.

When there is no fault in the yaw system, V=0; when a serious fault occurs in the yaw system, V=1. Therefore, the magnitude of V reflects the degree of the fault in the yaw system. Therefore, to accurately determine whether a fault exists, a fault threshold for the fault identification model can be set: if the output result of the fault identification model is greater than the fault threshold for the fault identification model, it is determined that a fault exists; and if the output result of the fault identification model is less than or equal to the fault threshold the fault identification model, it is determined that no fault exists.

In this embodiment, the fault threshold for the fault identification model is set by acquiring historical data of the yaw system of the wind turbine generator set. For example, the fault threshold for the fault identification model is set to 0.2. By setting the fault threshold for the fault identification model, the model can give a clear fault determination, i.e., if V>0.2, then it is regarded as a fault; and if V is less or equal to 0.2, it is regarded as normal. The model outputs the probability of fault occurrence, which provides a quantitative measure for evaluating fault risks. The fault threshold for the fault identification model can be adjusted according to actual conditions to balance the missed alarm rate and false alarm rate.

103. Performing the fault early warning based on the fault identification result.

By comparing the output value of the fault identification model with the fault threshold for the fault identification model, it is accurately determined whether a fault has occurred. If the fault identification result indicates a fault, a first classification is performed on the fault identification result to determine a first fault type, where the first fault type includes an actuator fault and a wind vane fault of the yaw system. Identifying whether the fault belongs to the actuator or the wind vane of the yaw system is conducive to narrowing down the scope of fault investigation. Then, the fault early warning is performed based on the actuator fault and the wind vane fault, respectively. The actuator fault may involve a deceleration transmission device, a positioning device and the like of the yaw system. The wind vane is an important component of the yaw system, used to detect the wind direction and adjust the direction of the wind turbine accordingly to capture more wind energy. Different fault types can adopt different alarm manners to intuitively and quickly prompt relevant personnel that the fault has occurred.

In this embodiment, due to performing early warning through the fault identification model, the timeliness of the fault early warning is effectively ensured, corresponding preventive maintenance can be taken during a fault incubation period, and the safety of the yaw system is guaranteed. Moreover, the fault early warning model is determined by multiple types of data, which further improves the accuracy of the fault early warning.

Further, on the basis of the above embodiment, in this embodiment, performing a first classification on the fault identification result to determine a first fault type includes: acquiring first wind direction data of the wind vane of the yaw system of the wind turbine generator set in a first time period, and constructing a first wind direction sequence; acquiring second wind direction data of a wind direction of a wind farm in the first time period, and constructing a second wind direction sequence, each wind farm including a plurality of wind turbine generator sets; real-time data of the wind direction of the wind farm can be obtained by installing a weather station in the wind farm, which is equipped with an anemometer and an anemovane, and these devices can monitor wind speed and direction in real time and transmit data to a control centre; alternatively, wind direction and speed information of the area where the wind farm is located can be obtained through satellite remote sensing technology.

A similarity value between the first wind direction sequence and the second wind direction sequence is determined; if the similarity value is greater than or equal to a similarity threshold, then it is determined that the first fault type is the actuator fault of the yaw system; and if the similarity value is less than the similarity threshold, then it is determined that the first fault type is the wind vane fault.

And the similarity is calculated by formulas (4), (5), (6), and (7):

$$F_{AV}(l) = \left\{ \frac{1}{N-l}\sum_{l_0=1}^{N-l}\left[\Delta d_A(l, l_0) - \frac{1}{N-l}\sum_{l_0=1}^{N-l}\Delta d_A(l, l_0)\right] \times \right. \tag{4}$$

$$\left. \left[\Delta 6 d_v(l, l_0) - \frac{1}{N-l}\sum_{l_0=1}^{N-l}\Delta d_v(l, l_0)\right]\right\}^{1/2}$$

$$F_{AV}(l) \sim l^\alpha \tag{5}$$

where $\alpha$ is the similarity value, with a value range of (0, 1).

$$\Delta d_A(l, l_0) = d_A(l + l_0) - d_A(l_0) \tag{6}$$

$$\Delta d_v(l, l_0) = d_v(l + l_0) - d_v(l_0)$$

$$l = 1, 2, \ldots, N-1; l_0 = 1, 2, \ldots, N-l \tag{7}$$

$$d_A(l) = \sum_{k=1}^{l}\left[D_A(i) - \overline{D_A}\right]$$

$$d_v(l) = \sum_{k=1}^{l}\left[D_V(i) - \overline{D_V}\right]$$

where $D_A(i)$ is a wind vane sequence; $D_V(i)$ is a wind farm sequence; $d_A(l)$ is a wind vane cumulative sequence; $d_V(l)$ is a wind farm cumulative sequence; $l$ is a sampling step, $l=1, 2, \ldots, N-1$; $\overline{D_A}$ represents a mean value of the wind vane sequence; $\overline{D_V}$ represents a mean value of the wind farm sequence.

For example, the similarity threshold can be set to 0.5: if the similarity value is greater than or equal to 0.5, the fault type is the actuator fault of the yaw system; and if the similarity value is less than 0.5, the fault type is the wind vane fault. A larger similarity value indicates a higher possibility of the actuator fault of the yaw system.

Further, if the first fault type is the actuator fault of the yaw system, a second classification is performed on the actuator fault of the yaw system to determine a second fault type; the second fault type includes a transmission system fault and a positioning system fault; the fault early warning is performed based on the transmission system fault and the positioning system fault.

The transmission system fault is identified by the following formula (8):

$$i' = \frac{\omega_{in}}{\omega_{out}} \tag{8}$$

$$\alpha_{out} = \frac{T_{out}}{J_{out}}$$

where i' represents a calculated transmission ratio; i represents a designed transmission ratio; $\omega_{in}$ represents an angular velocity of an input end of the transmission system; $\omega_{out}$ represents an angular velocity of an output end of the transmission system; $T_{out}$ represents a torque of the output end of the transmission system; $J_{out}$ represents a moment of inertia of the output end of the transmission system; and $\alpha_{out}$ represents an angular acceleration of the output end of the transmission system.

The determination step is specifically:

acquiring the historical data of the yaw system of the wind turbine generator set, where the historical data includes the designed transmission ratio of the transmission system, and the angular acceleration of the output end of the transmission system during normal operation and abnormal operation of the transmission system;

setting a fault threshold for the angular acceleration of the output end of the transmission system according to the angular acceleration of the output end of the transmission system during normal operation and abnormal operation of the transmission system;

comparing the calculated transmission ratio with the designed transmission ratio; if they are different, then the transmission system is faulty;

if they are the same, then determining a relationship between the angular acceleration of the output end of the transmission system and the fault threshold for the angular acceleration of the output end of the transmission system;

if a calculated angular acceleration of the output end of the transmission system is outside the fault threshold for the angular acceleration of the output end of the transmission system, then the transmission system is faulty; if the calculated angular acceleration of the output end of the transmission system is within the fault threshold for the angular acceleration of the output end of the transmission system, then the transmission system is not faulty.

the positioning system fault is identified by the following formula (9):

$$G(s) = \frac{K}{\Gamma s + 1} \tag{9}$$

where G(s) represents a transfer function of the positioning system; K represents a feedback coefficient of the positioning system, indicating a proportional relationship between an output signal and an input signal; $\Gamma$ represents a feedback filtering time constant; and s represents a complex variable in Laplace transform.

The determination step is:

acquiring the historical data of the yaw system of the wind turbine generator set, where the historical data includes historical amplitude-frequency characteristics of the positioning system;

calculating real-time amplitude-frequency characteristics of the positioning system, i.e., a modulus |G(s)| of the positioning system G(s);

comparing the historical amplitude-frequency characteristics with the real-time amplitude-frequency characteristics of the positioning system; if they do not match, then the positioning system is faulty; if they match, the positioning system is not faulty.

s is a complex variable in the Laplace domain, expressed as $s=j\overline{\omega}$, $G(j\overline{\omega})$ represents a response of the positioning system to an input signal with frequency $\overline{\omega}$, by analysing the frequency response of the transfer function of the positioning system, the response of the positioning system to inputs of different frequencies is obtained, a modulus $|G(j\overline{\omega})|$ of $G(\overline{\omega})$ represents a amplitude-frequency characteristic of a system gain, i.e., the gain amplitude at different frequencies, if the amplitude-frequency characteristic of the positioning system does not match a preset one, then it indicates that the positioning system has a fault.

The present application improves the accuracy of early warning by constructing the fault identification model. By identifying potential faults early, preventive maintenance measures can be taken to avoid expensive emergency repairs, thereby reducing maintenance costs. Further, the real-time data of the yaw system of the wind turbine generator set is used for fault identification, and the fault model' calculation is simple. Since the yaw mechanism has many structures, by using the fault identification model of this embodiment, the calculation amount of the first step of fault identification is reduced. After identifying whether a fault exists, the fault type is classified. When classifying the fault, the first classification is performed first, to first determine whether it is the actuator fault or the wind vane fault of the yaw system. Since the structure of the actuator is relatively complex, first determining whether it is the wind vane fault (if so, there is no need to proceed with the next step of fault classification) reduces the calculation amount and improves the efficiency of fault identification. Further, if it is the actuator fault, the second classification is further performed on the actuator fault, which can provide maintenance personnel with more specific fault information, facilitating them to take targeted maintenance measures.

Based on the same general inventive concept, the present application also provides a device for fault early warning of a yaw system of a wind turbine generator set. The device for fault early warning of a yaw system of a wind turbine generator set provided by the present application is described below, and the XX device described below and the method for fault early warning of a yaw system of a wind turbine generator set described above can correspond to and refer to each other.

FIG. 2 is a schematic structural diagram of a device for fault early warning of a yaw system of a wind turbine generator set according to this embodiment.

As shown in FIG. 2, the device for fault early warning of a yaw system of a wind turbine generator set according to this embodiment includes:

a detection module 201 configured to monitor real-time data of the yaw system of the wind turbine generator set, where the real-time data includes effective output power and incoming wind speed, and the incoming wind speed includes an average incoming wind speed at the effective output power and an average incoming wind speed at a rated power;

an identification module 202 configured to input the effective output power, the average incoming wind speed at the effective output power, and the average incoming wind speed at the rated power into a pre-constructed fault identification model, and output a fault identification result;

an early warning module 203 configured to perform the fault early warning based on the fault identification result;

where the fault identification model is:

$$V = 1 - \frac{P/\overline{V}^3}{P_0/\overline{V_0}^3}$$

In the formula, V represents the fault identification result, with a value range of (0, 1); P represents the effective output power; $P_0$ is the rated power of the wind turbine generator set; $\overline{V}$ represents the average incoming wind speed at the effective output power; and $\overline{V_0}$ represents the average incoming wind speed at the rated power.

Figure 3:
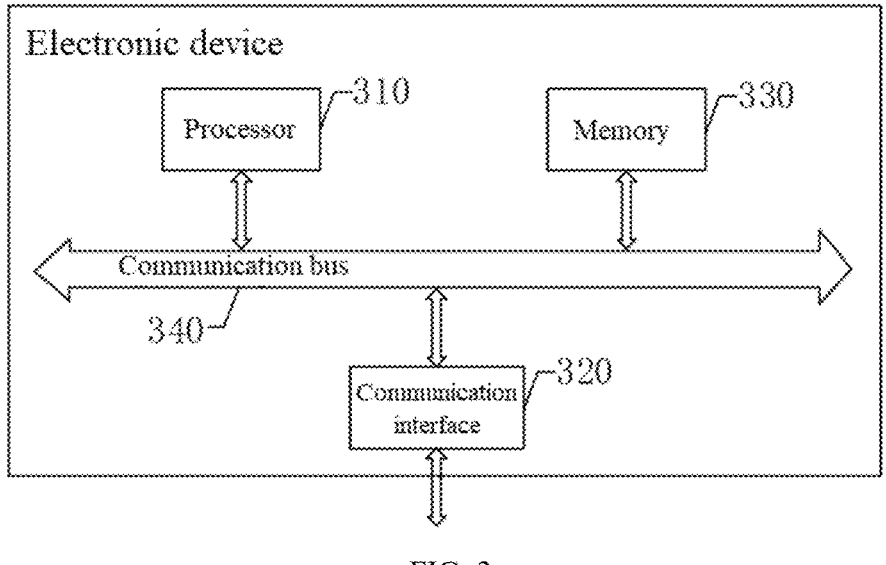
FIG. 3 is a schematic structural diagram of an electronic device according to this embodiment.

FIG. 3 is a schematic structural diagram of an electronic device according to this embodiment.

As shown in FIG. 3, the electronic device may include: a processor 310, a communication interface 320, a memory 330, and a communication bus 340, where the processor 310, the communication interface 320, and the memory 330 complete mutual communication through the communication bus 340. The processor 310 may call logical instructions in the memory 330 to execute the method for fault early warning of a yaw system of a wind turbine generator set, which includes: monitoring real-time data of the yaw system of the wind turbine generator set, where the real-time data includes effective output power and incoming wind speed, and the incoming wind speed includes an average incoming wind speed at the effective output power and an average incoming wind speed at a rated power; inputting the effective output power, the average incoming wind speed at the effective output power, and the average incoming wind speed at the rated power into a pre-constructed fault identification model, which outputs a fault identification result; and performing the fault early warning based on the fault identification result.

In addition, the logical instructions in the above-mentioned memory 330 may be implemented in the form of software functional units and, when sold or used as an independent product, may be stored in a computer-readable storage medium. Based on such understanding, the technical solution of the present application essentially or the part contributing to the prior art or the part of the technical solution may be embodied in the form of a software product, and the computer software product is stored in a storage medium, including several instructions to enable a computer device (which may be a personal computer, a server, or a network device, etc.) to execute all or part of the steps of the methods described in the various embodiments of the present application. The aforementioned storage medium includes: a USB flash drive, a removable hard disk, a read-only memory (ROM), a random-access memory (RAM), a magnetic disk, or an optical disc and various other media that can store program codes.

On the other hand, the present application further provides a computer program product, where the computer program product includes a computer program, the computer program may be stored on a non-transitory computer-readable storage medium, and when the computer program is executed by a processor, the computer can execute the method for fault early warning of a yaw system of a wind turbine generator set provided by the above methods, which includes: monitoring real-time data of the yaw system of the wind turbine generator set, where the real-time data includes effective output power and incoming wind speed, and the incoming wind speed includes an average incoming wind speed at the effective output power and an average incoming wind speed at a rated power; inputting the effective output power, the average incoming wind speed at the effective output power, and the average incoming wind speed at the rated power into a pre-constructed fault identification model, which output a fault identification result; and performing the fault early warning based on the fault identification result.

In yet another aspect, the present application further provides a non-transitory computer-readable storage medium having a computer program stored thereon, where the computer program is executed by a processor to implement the method for fault early warning of a yaw system of a wind turbine generator set provided by the above methods, which includes: monitoring real-time data of the yaw system of the wind turbine generator set, where the real-time data includes effective output power and incoming wind speed, and the incoming wind speed includes an average incoming wind speed at the effective output power and an average incoming wind speed at a rated power; inputting the effective output power, the average incoming wind speed at the effective output power, and the average incoming wind speed at the rated power into a pre-constructed fault identification model, which outputs a fault identification result; and performing the fault early warning based on the fault identification result.

The device embodiments described above are only schematic, where the units described as separate components may or may not be physically separate, and the components displayed as units may or may not be physical units, i.e., they may be located in one place, or may be distributed on multiple network units. Some or all of the modules may be selected according to actual needs to achieve the purpose of the solution of this embodiment. Those of ordinary skill in the art can understand and implement it without creative efforts.

Through the description of the above implementations, those of skill in the art can clearly understand that each implementation can be implemented by means of software plus a necessary general hardware platform, and certainly can also be implemented by hardware. Based on such understanding, the above technical solution essentially or the part contributing to the prior art can be embodied in the form of a software product, and the computer software product can be stored in a computer-readable storage medium, such as ROM/RAM, magnetic disk, optical disc, etc., including several instructions to enable a computer device (which may be a personal computer, a server, or a network device, etc.) to execute all or part of the steps of the methods described in each embodiment or some parts of the embodiments.

Finally, it should be noted that the above embodiments are only used to illustrate the technical solutions of the present application, but not to limit them; although the present application has been described in detail with reference to the foregoing embodiments, those of ordinary skill in the art should understand that: they can still modify the technical solutions recited in the foregoing embodiments, or equivalently replace some technical features in the technical solutions; and these modifications or replacements do not make the essence of the corresponding technical solutions deviate from the spirit and scope of the technical solutions of the embodiments of the present application.

What is claimed is:

1. A method for fault early warning of a yaw system of a wind turbine generator set, comprising:
   monitoring real-time data of the yaw system of the wind turbine generator set, wherein the real-time data includes an effective output power and an incoming wind speed, and the incoming wind speed includes an average incoming wind speed at the effective output power and an average incoming wind speed at a rated power;
   inputting the effective output power, the average incoming wind speed at the effective output power, and the average incoming wind speed at the rated power into a pre-constructed fault identification model, which outputs a fault identification result; and performing the fault early warning based on the fault identification result, including: if the fault identification result indicates a fault, then performing a first classification on the fault identification result to determine a first fault type, wherein the first fault type comprises an actuator fault and a wind vane fault of the yaw system; and performing the fault early warning based on the actuator fault and the wind vane fault, respectively;

wherein said performing a first classification on the fault identification result to determine a first fault type includes: acquiring first wind direction data of a wind vane of the yaw system of the wind turbine generator set in a first time period, and constructing a first wind direction sequence; acquiring second wind direction data of a wind direction of a wind farm in the first time period, and constructing a second wind direction sequence; determining a similarity value between the first wind direction sequence and the second wind direction sequence; if the similarity value is greater than or equal to a similarity threshold, then determining that the first fault type is the actuator fault of the yaw system; and if the similarity value is less than the similarity threshold, then determining that the first fault type is the wind vane fault; and wherein the fault identification model is the following formula:

$$V = 1 - \frac{P/\overline{V}^3}{P_0/\overline{V_0}^3};$$

in the formula, V represents the fault identification result, with a value range of (0, 1); P represents the effective output power; $P_0$ is the rated power of the wind turbine generator set; $\overline{V}$ represents the average incoming wind speed at the effective output power; and $\overline{V_0}$ represents the average incoming wind speed at the rated power.

2. The method for fault early warning of a yaw system of a wind turbine generator set according to claim 1, wherein the effective output power of the wind turbine generator set is monitored according to:

$$P = \frac{1}{2}\rho\pi r^2 C_P \ (\overline{V}\cos\theta)^3$$

the rated power of the wind turbine generator set is monitored according to:

$$P_0 = \frac{1}{2}\rho\pi r^2 C_P \overline{V}_0^3$$

where ρ is an air density under standard atmospheric pressure; r is a radius of a wind turbine impeller; $C_P$ is a wind energy utilization coefficient under normal operating conditions; and θ is an included angle between the wind direction and a nacelle position.

3. The method for fault early warning of a yaw system of a wind turbine generator set according to claim 1, further comprising:

if the first fault type is the actuator fault of the yaw system, then performing a second classification on the actuator fault of the yaw system to determine a second fault type, the second fault type comprises a transmission system fault and a positioning system fault; and performing the fault early warning based on the transmission system fault and the positioning system fault.

4. The method for fault early warning of a yaw system of a wind turbine generator set according to claim 3, wherein the transmission system fault is identified by the following formulas:

$$i' = \frac{\omega_{in}}{\omega_{out}}$$

$$\alpha_{out} = \frac{T_{out}}{J_{out}}$$

where i' represents a calculated transmission ratio; i represents a designed transmission ratio; $\omega_{in}$ represents an angular velocity of an input end of the transmission system; $\omega_{out}$ represents an angular velocity of an output end of the transmission system; $T_{out}$ represents a torque of the output end of the transmission system; $J_{out}$ represents a moment of inertia of the output end of the transmission system; and $\alpha_{out}$ represents an angular acceleration of the output end of the transmission system.

5. The method for fault early warning of a yaw system of a wind turbine generator set according to claim 4, further comprising:

acquiring historical data of the yaw system of the wind turbine generator set, wherein the historical data includes the designed transmission ratio of the transmission system, and the angular acceleration of the output end of the transmission system during normal operation and abnormal operation of the transmission system;

setting a fault threshold for the angular acceleration of the output end of the transmission system according to the angular acceleration of the output end of the transmission system during normal operation and abnormal operation of the transmission system;

comparing the calculated transmission ratio with the designed transmission ratio; and if the calculated transmission ratio and the designed transmission ratio are different, then the transmission system is faulty;

if the calculated transmission ratio and the designed transmission ratio are the same, then determining a relationship between the angular acceleration of the output end of the transmission system and the fault threshold for the angular acceleration of the output end of the transmission system;

if a calculated angular acceleration of the output end of the transmission system is outside the fault threshold for the angular acceleration of the output end of the transmission system, then the transmission system is faulty.

6. The method for fault early warning of a yaw system of a wind turbine generator set according to claim 3, wherein the positioning system fault is identified by the following formula:

$$G(s) = \frac{K}{\Gamma s + 1}$$

where G(s) represents a transfer function of the positioning system; K represents a feedback coefficient of the positioning system, indicating a proportional relation-
ship between an output signal and an input signal; Γ
represents a feedback filtering time constant; and s
represents a complex variable in Laplace transform.

7. The method for fault early warning of a yaw system of
a wind turbine generator set according to claim 6, further
comprising:
    acquiring historical data of the yaw system of the wind
    turbine generator set, wherein the historical data
    includes historical amplitude-frequency characteristics
    of the positioning system;
    calculating real-time amplitude-frequency characteristics
    of the positioning system;
    comparing the historical amplitude-frequency character-
    istics with the real-time amplitude-frequency charac-
    teristics of the positioning system; and if the historical
    amplitude-frequency characteristics do not match the
    real-time amplitude-frequency characteristics, deter-
    mining that the positioning system is faulty.

8. A device for fault early warning of a yaw system of a
wind turbine generator set, comprising:
    a detection module configured to monitor real-time data
    of the yaw system of the wind turbine generator set,
    wherein the real-time data includes an effective output
    power and an incoming wind speed, and the incoming
    wind speed includes an average incoming wind speed
    at the effective output power and an average incoming
    wind speed at a rated power;
    an identification module configured to input the effective
    output power, the average incoming wind speed at the
    effective output power, and the average incoming wind
    speed at the rated power into a pre-constructed fault
    identification model, and output a fault identification
    result; and
    an early warning module configured to perform the fault
    early warning based on the fault identification result,
    including: if the fault identification result indicates a fault, then performing a first classification on the fault
identification result to determine a first fault type,
wherein the first fault type comprises an actuator fault
and a wind vane fault of the yaw system; and perform-
ing the fault early warning based on the actuator fault
and the wind vane fault, respectively; wherein said
performing a first classification on the fault identifica-
tion result to determine a first fault type includes:
acquiring first wind direction data of a wind vane of the
yaw system of the wind turbine generator set in a first
time period, and constructing a first wind direction
sequence; acquiring second wind direction data of a
wind direction of a wind farm in the first time period,
and constructing a second wind direction sequence;
determining a similarity value between the first wind
direction sequence and the second wind direction
sequence; if the similarity value is greater than or equal
to a similarity threshold, then determining that the first
fault type is the actuator fault of the yaw system; and
if the similarity value is less than the similarity thresh-
old, then determining that the first fault type is the wind
vane fault; and
wherein the fault identification model is the following
    formula:

$$V = 1 - \frac{P/\overline{V}^3}{P_0/\overline{V_0}^3};$$

in the formula, V represents the fault identification result,
    with a value range of (0, 1); P represents the effective
    output power; $P_0$ is the rated power of the wind turbine
    generator set; $\overline{V}$ represents the average incoming wind
    speed at the effective output power; and $\overline{V_0}$ represents
    the average incoming wind speed at the rated power.

* * * * *